March 15, 1966 H. E. TOWNER 3,240,686

BISTABLE MAGNETIC THIN FILM ELEMENT AND ELECTROLYTIC PROCESS FOR MAKING SAME

Filed May 25, 1962 2 Sheets-Sheet 1

INVENTOR
HARRY E. TOWNER

BY George O. Saile

ATTORNEY

March 15, 1966 H. E. TOWNER 3,240,686

BISTABLE MAGNETIC THIN FILM ELEMENT AND ELECTROLYTIC PROCESS FOR MAKING SAME

Filed May 25, 1962 2 Sheets-Sheet 2

3,240,686

BISTABLE MAGNETIC THIN FILM ELEMENT AND ELECTROLYTIC PROCESS FOR MAKING SAME

Harry E. Towner, Hyde Park, N.Y., assignor to International Business Machines Corporation, New York, N.Y., a corporation of New York Filed May 25, 1962, Ser. No. 197,724
18 Claims. (Cl. 204—25)

The present invention relates to a bistable closed flux magnetic core, and more particularly, to a process for the fabrication of such metal cores.

The increasing demand for faster and more reliable computers has directed present day interests to solid state electronic components. The most significant result of this work is the development of the ferrite core with its square loop characteristics so uniform and reliable that computers employing more than a million cores perform reliably.

The development of thin magnetic film devices for use as storage elements in a digital computer has been under considerable study. Much of the motivation for the study of thin magnetic films has been the desire to improve the speed-to-power relation of present ferrite core memories. The speed of the memories has so far been limited by the speed with which the magnetization can be reversed between the two stable states representing the information 1 and 0.

It is known that thin magnetic films may be deposited on suitable substrates by such well known techniques as evaporation in a high vacuum, by electroplating or sputtering. The preparation of evaporated metallic films, however, has been given a great deal more attention by investigators than either of the other two mentioned fabrication techniques. Additionally, almost exclusive effort has been given to the depositing of the magnetic layers on flat substrates. Further, the main theme of the fabricator's efforts has been to, in one depositing step, make a magnetic film which is capable of storing a great number of bits of information.

A major problem of thin magnetic film memories lies in their preparation. The technique for producing homogenous and reproducible thin bistable magnetic elements in quantity has completely eluded all investigators until the present time. In spite of the many difficulties encountered, there have been experimental thin magnetic film memories built and tested. Such memories are on a very small scale. The investigators, until the present invention, have completely failed in their efforts to reproduce in thin magnetic film core memories the reliability of the present day ferrite core memories.

It is thus an object of the present invention to provide a bistable magnetic core which has a substantially lower switching constant than the present day ferrite cores and may be fabricated in large quantities with reproducible characteristics.

It is another object of the present invention to provide a process for the fabrication of a bistable magnetic core which is effective to produce large quantities of the cores within close tolerances and of high reliability.

Further, it is an object of this invention to provide a process to produce bistable magnetic cores having optimum properties and directly replaceable into the circuits presently using the ferrite cores.

These and other objects are accomplished in accordance with the broad aspects of the present invention by utilizing a novel electroplating procedure. A substrate is placed in the electrolytic bath which contains the salt or salts of the ferromagnetic metal or metals to be plated. The external surface of the substrate is made the cathode of the cell and a suitable anode is positioned in the cell.

Provision is made to orient the electrodeposit as deposited in a uniaxial direction. The uniaxial orienting field is applied during only 60 to 95% of the period of the electroplating. The electroplated film element, when used as a substitute for the ferrite core, produced by this procedure possesses high speed switching properties that are not obtainable when the orienting field is applied for 100% of the period of electroplating.

The foregoing and other objects, features and advantages of the invention will be apparent from the following more particular description of the preferred embodiments of the invention, as illustrated in the accompanying drawings.

Figure 1:
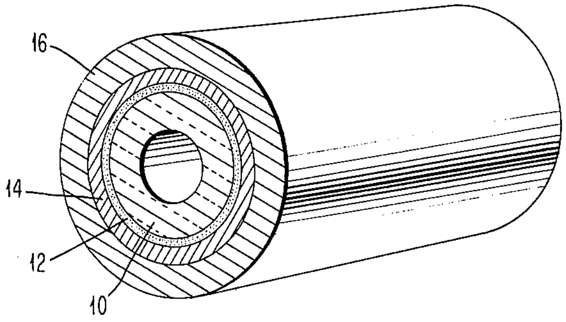
FIGURE 1 is a perspective sectional view of a bistable magnetic core made by the present invention.

Referring now, more particularly, to FIGURE 1 there is shown a bistable magnetic core made by the present invention and useful as a direct substitute for ferrite cores in the parallel mode operation. The magnetic core illustrated is composed of a cylindrical siliceous substrate 10 preferably of glass, a conductive metallic layer 14 preferably of gold, and an electroplated ferromagnetic substantially circumferentially oriented alloy layer 16. Where gold is used as the conductive metal, it is preferable to use an adhesive metallic layer 12 of chromium or its equivalent between the glass substrate and the gold conductive layer. The adherence of the gold layer to chromium is substantially superior to its adherence to glass. The substrate is of very small diameter. Inside diameter (I.D.) to outside diameter (O.D.) sizes of 20–30, 25–30, 20–25 and 15–20 mils have been used and even smaller diameters are possible. The height of the magnetic storage element is very small and is preferably 100 mils or less.

To obtain the desired bistable magnetic core characteristics and properties, the process must be carefully controlled and the thicknesses of the various layers over the siliceous substrate are important. The surface condition of the siliceous substrate prior to electroplating is of great importance. A compromise is therefore effected between the conductive underlayer thickness and the desire to use a thick underlayer to minimize current density and, therefore composition and ferromagnetic film thickness along the length of the tube. The conductive layer adhesion of the siliceous substrate is particularly important.

The conductive layer and the adhesive layer, where used, are first applied by vacuum evaporation procedures. A siliceous material tube of substantial length is thoroughly cleaned, dried and then placed in a vacuum evaporation chamber. A coating of a metal or metal alloy of such materials as chromium, titanium or an alloy of nickel and chromium having a thickness of approximately 50 to 100 angstrom units is first condensed upon the external surface of the substrate surface. Without breaking vacuum, a layer of conductive metal is then evaporated over the just deposited metal layer. The thickness of the conductive layer is preferably within the range of 50 to 300 angstrom units.

Figure 2:
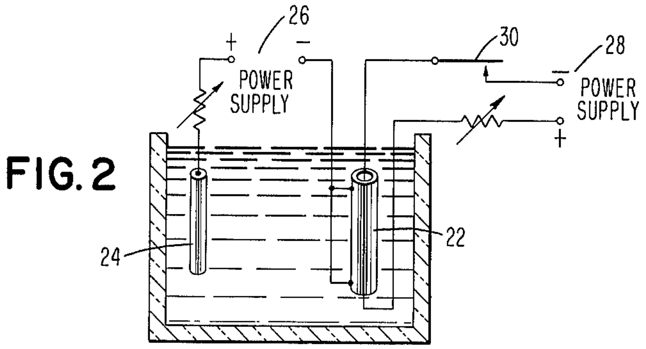
FIGURE 2 is a diagrammatic view of the electroplating set-up of the present invention.

The conductive surface is now prepared for the novel electroplating procedure of the invention. FIGURE 2 shows schematically the electrical set-up for electroplating. The electrolyte 20 includes at least one salt of the ferromagnetic metal to be plated in solution. The substrate having the conductive layer thereover has its ends closed with silver metal and then introduced into the electrolyte. The conductive layer is made the cathode 22 of the electrolytic cell. A suitable anode 24 is introduced as the anode of the cell. The anode and the cathode are connected respectively to the plus and minus terminals of a first power supply 26. The cathode is connected at both ends of the conductive layer to the negative terminal of the power supply 26 to improve the evenness of the electrodeposit. Means are provided to apply a circumferential orienting field during the electroplating around the conductive substrate 22. One such means is shown in FIGURE 2 as an electrical conductor through the center of the cylinder and connected to a second power supply 28. A switch 30 is provided for turning the orienting current on and off.

The electrolytic bath may be one of various known compositions. The principal types for electrodepositing ferromagnetic material in the art are the sulfate, sulfamate, chloride and a combination of sulfate and chloride baths. The names of the electrolytic baths are taken from the name of the metal salt used to provide the required ferromagnetic ions to the bath.

The preferred bath, however, is the aqueous chloride bath wherein the ferromagnetic ions, such as $Ni^{++}$ and $Fe^{++}$, are brought into solution by means of nickel and iron chlorides. The other constituents of the bath include a buffer, an inorganic chloride, a wetting agent and a stress reducing material. Boric acid is the preferred buffer. The inorganic chloride, which may be for example a sodium or potassium chloride, favors dissolving of the anode in the case of soluble anodes and increases the conductivity of the bath. An example of the wetting agent is sodium lauryl sulfate and is used to decrease the adhesion of the hydrogen bubbles on the cathode surface. The stress reducing agent is preferably saccharin. Saccharin reduces the stresses in the electrodeposit by a large percentage.

The bath composition and the electrolyzing current density have substantial influences upon the iron content of the ferromagnetic deposit. Where the ferromagnetic deposit is to be a nickel-iron alloy, as an example, the iron content in the electrodeposit would increase where either the current density or the bath concentration of the $Fe^{++}$ increased. The adjustment of the current density, however, is the preferred method of varying the alloy composition.

Electroplating is initiated by passing a current between the cathode 22 and the anode 24. According to the novel procdure of the invention, the circumferential orienting field is applied during between 60 and 95% of the electroplating period. The orienting field is left off during preferably either the first portion or the last portion of the electroplating period.

It is not fully known what orientation occurs in the electrodeposit during the time that the orienting field is off and within the changeover from no positive orienting field to a circumferential field. It is certain, however, that the orientation during this period when the orienting field is left off, is other than in the circumferential orienting period. It might be postulated then that the overall orienting of the electrodeposit is slightly skewed from the circumferential orientation. Nevertheless, the magnetic core produced by the novel procedure of the present invention is substantially superior in switching properties to that of the magnetic core fabricated with a circumferential orienting field throughout the electroplating period when the core is used in a parellel mode array.

A permalloy film of approximately 75 to 82% nickel and the remaining percentage iron is the preferred ferromagnetic film. The film is deposited to a thickness preferably between 11,000 and 15,000 angstrom units where the substrate is cylindrical. The substrate, whether flat or cylindrical, and the diameter of the cylindrical substrate require adjustment of the plating current to produce the desired film thickness and composition.

Following the electroplating procedure, the plated article may be subjected to various tests to insure operativeness and uniformity between electroplated articles. The acceptable electroplated articles are then arranged in columns, each article with its axis parallel to the axes of the others, and a suitable encapsulating compound is molded around them to form a solid block of embedded elongated articles. Once the encapsulating compound has firmly set, the articles are sliced into magnetic cores of approximately 100 mils or less in height by a suitable cutting wheel. The encapsulating material is removed and the magnetic cores can then be tested to specification. In this manner, the problem of obtaining uniformity and reliability in a memory unit containing a large number of storage areas is relieved. The magnetic core portions of the electroplated articles that are out of specification for one reason or another are simply thrown away. In the case of a memory unit where one storage area is out of specification, the whole unit must be discarded.

Using the novel process of this invention bistable closed flux magnetic cores using glass tubing of 20–25 mil I.D.-O.D. and 20 mil height according to the following specification are readily obtainable.

Read current, $I_r$=700 ma.±10%

Pulse width, $T_d$=75 nanosec.

Word current, $I_r$=250 ma.±10%

Pulse width, $T_d$=100 nanosec.

Bit current, $I_b$=140 ma.±10%

Pulse width, $T_d$=125 nanosec.

Bias current, $I_c$=47.5 ma.±5%

Read Disturbs=60 ma.

Pulse width, $T_0$=100 nanosec.

Time constant=30 nanosec.

Read "0," $dV_z \leqq 6$ mv.

Read "1," $dV_1 \geqq 20$ mv.

Time to switch, $T_s$=45–60 nanosec.

Coercivity—0.5 oersted

Switch constants—.02–.03 oe. μsec.

Magnetic cores have been obtained from the procedure of the present invention that has a read disturbed "1" of 37 millivolts and a read disturbed "0" of 4 millivolts. Switch constant values have been obtained as low as 0.007 oersted microsecond.

The following are examples of the present invention in detail. The examples are included merely to aid in the understanding of the invention, and variations may be made by one skilled in the art without departing from spirit and scope of this invention.

*Example 1*

A .030 inch outside diameter-.020 inch inside diameter glass tube, 3 inches long was thoroughly cleaned and dried. The tube was inserted into a standard vacuum evaporation chamber and coated on its external surface with a layer of chromium 50 to 100 Angstrom units in thickness. Immediately following this deposition without breaking vacuum, a gold evaporation to the resistance value of 2.5 ohms per square, which is roughly 100 to 200 Angstrom units, was applied to the surface of the chromium layer.

The cylindrical glass substrate with its conductive layer of gold on its external surface had its ends silvered closed and was placed in an electrolytic cell and made the cathode of the cell by connections to the conductive layer at each end of the tube. The electrolyte in the cell consisted of the following constituents in an aqueous solution:

| | G.l. |
|---|---|
| Nickel chloride ($NiCl_2 \cdot 6H_2O$ | 194 |
| Ferrous chloride ($FeCl_2 \cdot 4H_2O$) | 7.85 |
| Sodium chloride (NaCl) | 9.7 |
| Boric acid ($H_3BO_3$) | 25 |
| Saccharin | 1 |
| Sodium lauryl sulfate | 0.42 |

An electrical conductor was strung through the cylindrical substrate and connected as in FIGURE 2 to a power supply 28 through switch 30. This magnetic orienting circuit was set to carry current of 2.5 amperes. The 2.5 ampere current passing through the conductor generated a 13 oersted field about the conductor. The electrolyte temperature was maintained at 33.1±0.1° C. and a pH of 3.2±0.1. A plating current of 26.5 milliamps per square inch was passed between the cathode and the anode for twenty minutes. For the first two minutes of the plating, the orienting field was left off. The resultant plating had a thickness of approximately 12,000 to 13,000 Angstrom units with a composition of approximately 80% nickel and 20% iron.

The electroplated cylindrical article was encapsulated in a rosin (60%)-paraffin wax (40%) mixture which was then solidified. The embedded electroplated article was then cut along a plane perpendicular to its longitudinal axis a plurality of times with a diamond cutting wheel into 20 mil height sections. Each of these 20 mil sections is usable as a bistable closed flux magnetic core after removing the encapsulating plastic.

Figures 3A, 3B:
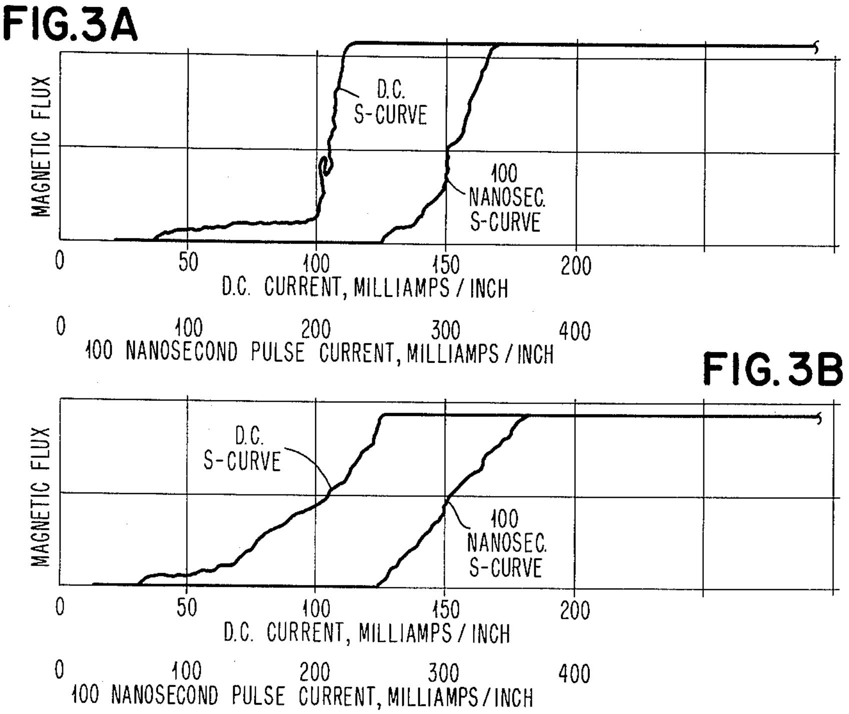
FIGURES 3A and 3B are "S-curves" for a metal bistable magnetic core according to the novel process of the invention wherein the orienting field was off for 10% of the plating period.

Two complete "S-curves" were run on a typical bistable magnetic core produced by this example and are illustrated as FIGURES 3A and 3B. The "S-curves" were obtained by progressively increasing the current flow in a conductor strung through the center of the magnetic core and recording the resulting magnetic flux in lines of flux per inch. In each figure, the "S-curve" was obtained for what is termed the D.C. curve by passing a sixty cycle current through the conductor. The 100 nanosecond pulse curve was obtained by the passage of 100 nanosecond pulses through the conductor.

*Example 2*

Figures 4A, 4B:
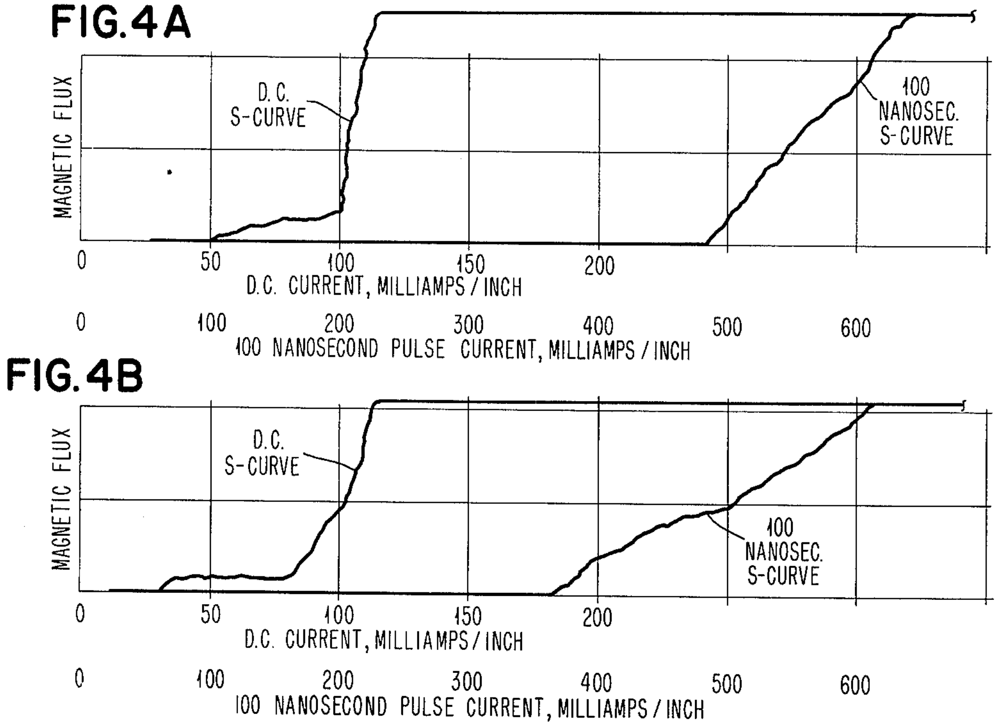
FIGURES 4A and 4B are "S-curves" for a metal bistable magnetic core produced with the orienting field on for 100% of the plating time.

The Example 1 was repeated with the exception that the orienting field was on at all times during electroplating time. The "S-curves" were run and illustrated as FIGURES 4A and 4B for a typical magnetic core produced by this example.

The resulting sets of curves given as FIGURES 3A and 3B and 4A and 4B can be visually compared. The D.C. "S-curves" are seen to remain constant in FIGURES 3 and 4. The 100 nanosecond curves of FIGURES 3A and 3B, however, are markedly faster in reaching their maximum magnetic flux value than the curves of FIGURES 4A and 4B. The switching period required for the magnetic cores produced by the novel process of the invention is therefore seen to be substantially reduced from that of the current applied during one hundred percent of the electroplating period. This faster switching time of the magnetic cores, when operated in the parallel mode, may be attributed to the torque that is set up due to the postulated overall slightly skewed from the circumferential orientation of the ferromagnetic layer.

Figure 5:
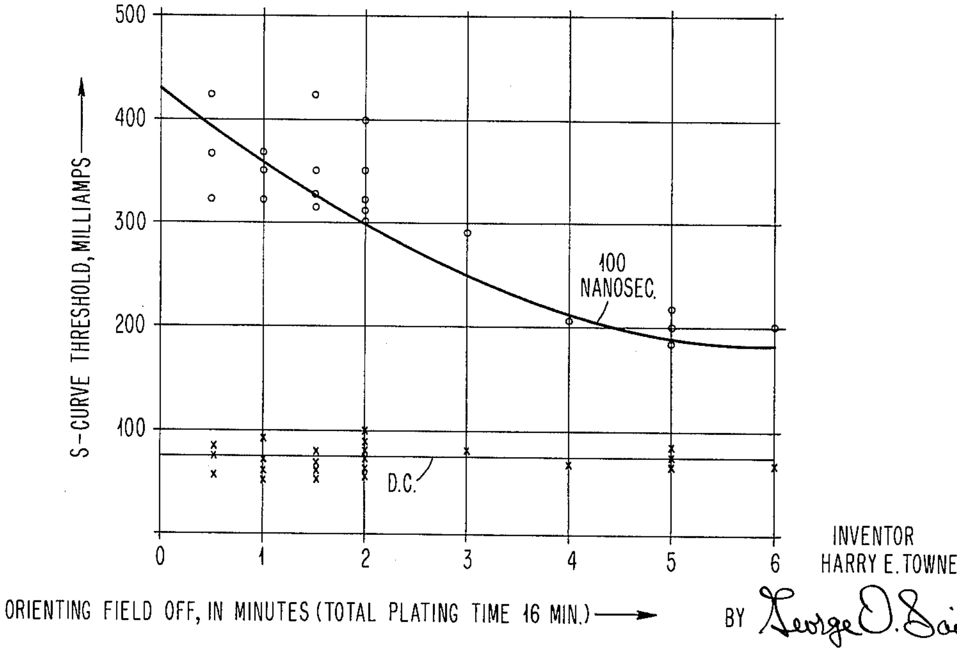
FIGURE 5 is a graphical representation giving 100 nanosecond pulse switching thresholds and D.C. thresholds versus various times which the orienting current was off during electroplating.

The FIGURE 5 curve correlates the orienting field off in time versus switching threshold and D.C. threshold. The D.C. threshold remains constant throughout the testing. It can be seen, however, from the curve that the switching threshold magnitude is reduced by having the circumferential orienting field off during part of the plating period. When the thickness of the unoriented layer is increased in relation to the thickness of the oriented layer, the total magnetic core output is reduced. Further, the hysteresis loop of the magnetic device will tend to become constricted upon the increase in thickness of the unoriented layer. It has been found that the oriented-unoriented electroplated layer combination produced by having the orienting current on from 60 to 95% of the electroplating period gives the bistable magnetic cores of the best properties for use in the parallel mode operation. The switching constants of the thin film bistable cores of the present invention are 5 to 10 times faster than ferrite cores under the same field conditions.

The invention thus provides a method for producing bistable magnetic cores that may be directly substituted into presently used ferrite core circuits. The magnetic cores of the invention when substituted for the ferrite cores produce substantially lower switching constants than the ferrite cores. These thin film devices may be fabricated cheaply in large quantities with highly reliable and uniform properties.

While this invention has been particularly shown and described with reference to a preferred embodiment thereof, it will be understood by those skilled in the art that the foregoing and other changes in form and details may be made therein without departing from the spirit and scope of the invention.

What is claimed is:

1. In a process for depositing in an electrolytic cell a ferromagnetic metal film onto an electrically conductive substrate comprising:
- introducing said substrate into an electrolyte containing at least one salt of the said ferromagnetic metal;
- making said substrate the cathode of said cell;
- introducing a suitable anode into said cell;
- passing a current between said cathode and said anode;
- and subjecting the said ferromagnetic film while it is being deposited to a uniaxial orienting field between 60 and 95% of the period of electroplating.

2. In a process for depositing in an electrolytic cell a ferromagnetic metal film onto the external surface of a cylindrical electrically conductive substrate comprising:
- introducing said substrate into an electrolyte containing at least one salt of the said ferromagnetic metal;
- making said substrate the cathode of said cell;
- introducing a suitable anode into said cell;
- passing a current between said cathode and said anode;
- and subjecting the said ferromagnetic film while it is being deposited to a circumferential orienting filed between 60 and 95% of the period of electroplating.

3. In a process for depositing in an electrolytic cell a ferromagnetic metal film onto a cylindrical siliceous substarte coated on its external surface with an electrically conductive metal comprising:
- introducing said coated substrate into an electrolyte containing at least one salt of the said ferromagnetic metal;
- making said conductive metal coating the cathode of said cell;
- introducing a suitable anode into said cell;
- electrodepositing a randomly oriented layer of ferromagnetic material over said coated substrate during 5 to 40% of the total electroplating period;
- and electrodepositiing a circumferentially oriented layer of ferromagnetic material over said coated substrate during the remaining portion of said electroplating period.

4. The process of claim 3 wherein the randomly oriented layer is deposited onto the said substrate and the circumferentially oriented layer deposited thereover.

5. The process of claim 3 wherein the circumferentially oriented layer is deposited onto the said coated substrate and the randomly oriented layer deposited thereover.

6. In a process for depositing in an electrolytic cell a nickel-iron alloy film onto a cylindrical substrate coated on its external surface with an electrically conductive metal comprising:

introducing said coated substrate into an electrolyte containing iron and nickel salts;
making said conductive metal coating the cathode of said cell;
introducing a suitable anode into said cell;
passing a current between said cathode and said anode;
and subjecting the said nickel-iron alloy film while it is being deposited to a circumferential orienting field between 60 and 95% of the period of electroplating.

7. In a process for depositing in an electrolytic cell a nickel-iron alloy film onto an electrically conductive substrate comprising:
introducing said substrate into an electrolyte containing iron and nickel salts;
making said substrate the cathode of said cell;
introducing a suitable anode into said cell;
electrodepositing a randomly oriented layer of nickel-iron alloy over said substrate during 5 to 40% of the total plating period;
and electrodepositing a circumferentially oriented layer of nickel-iron alloy over said substrate during the remaining portion of said electroplating period.

8. In a process for depositing in an electrolytic cell a nickel-iron alloy film onto a cylindrical siliceous substrate coated on its external surface with an electrically conductive metal comprising:
introducing said coated substrate into an electrolyte containing iron and nickel salts;
making said conductive metal coating the cathode of said cell;
introducing a suitable anode into said cell;
electrodepositing a randomly oriented layer of nickel-iron alloy onto said coated substrate during the first 5 to 40% of the total plating period;
and electrodepositing a circumferentially oriented layer of nickel-iron alloy over said randomly oriented layer during the remaining portion of said electroplating period.

9. In a process for depositing in an electrolytic cell a nickel-iron alloy film onto a cylindrical siliceous substrate coated on its external surface with an electrically conductive metal comprising:
introducing said coated substrate into an electrolyte containing iron and nickel salts;
making said conductive metal coating the cathode of said cell;
introducing a suitable anode into said cell;
electrodepositing a circumferentially oriented layer of nickel-iron alloy onto said coated substrate during the first 60 to 95% of the total plating period.
and electrodepositing a randomly oriented layer of nickel-iron alloy over said circumferentially oriented layer during the remaining portion of said electroplating period.

10. In a process for depositing in an electrolytic cell a nickel-iron alloy film onto a cylindrical siliceous substrate coated on its external surface with an electrically conductive metal comprising:
threading a current conductor through said cylindrical substrate;
introducing said coated substrate into an electrolyte containing iron and nickel salts;
making said conductive metal coating the cathode of said cell;
introducing a suitable anode into said cell;
passing a current between said cathode and said anode;
and passing a current through said conductor between 60 and 95% of the period of electroplating.

11. In a process for depositing in an electrolytic cell a nickel-iron alloy film onto a cylindrical siliceous substrate coated on its external surface with an electrically conductive metal comprising:
introducing said coated substrate into an electrolyte containing iron and nickel salts;
making said conductive metal coating the cathode of said cell;
introducing a suitable anode into said cell;
passing a current between said cathode and said anode;
and applying a circular orienting magnetic field around said cylindrical coated substrate between 60 and 95% of the period of electroplating.

12. A magnetic thin film having a low switching constant comprising:
an alloy having a composition of between about 75% and 82% nickel and the balance iron;
the orientation of between about 60% to 95% of the said magnetic thin film alloy in thickness is circumferential; and
the remaining thickness of the said magnetic thin film alloy being randomly oriented.

13. A bistable magnetic thin film element comprising:
a siliceous substrate;
an electrically conductive metal coating adhering to said substrate;
a bistable magnetic layer adhering to said conductive coating, which is composed of an alloy of between about 75% to 82% nickel and the balance iron; and
the orientation of said magnetic layer being circumferentially oriented for between about 60% to 95% of its thickness and randomly oriented for the remaining thickness.

14. The bistable magnetic layer of claim 13 wherein the circumferentially oriented portion of said magnetic layer is contiguous to said conductive coating.

15. The bistable magnetic layer of claim 13 wherein the randomly oriented portion of said magnetic layer is contiguous with said conductive coating.

16. The bistable magnetic layer of claim 13 wherein the said siliceous substrate is cylindrical.

17. A closed flux bistable magnetic thin film comprising:
a cylindrical substrate;
an electrically conductive metal coating adhering to said substrate;
an electrodeposited bistable magnetic layer, adhering to said conductive coating, which is composed of an alloy of between about 75% to 82% nickel and the balance iron; and
the orientation of said magnetic layer being circumferentially oriented for about 90% of its thickness and randomly oriented for the remaining thickness.

18. A closed flux bistable magnetic thin film comprising:
a cylindrical siliceous substrate;
an electrically conductive metal coating adhering to said substrate;
an electrodeposited bistable magnetic layer, adhering to said conductive coating, composed of an alloy of between about 75% to 82% nickel and the balance iron;
the said magnetic layer including first and second portions;
said first portion being randomly oriented and contiguous to said conductive coating;
said second portion being circumferentially oriented and overlaying the first portion; and
said second portion being 90% of said magnetic layer.

References Cited by the Examiner

UNITED STATES PATENTS 3,065,105 11/1962 Pohm ---------------- 204—22

FOREIGN PATENTS 328,057 4/1930 Great Britain.

JOHN H. MACK, *Primary Examiner.*